United States Patent
Schwarz

(10) Patent No.: US 10,754,991 B2
(45) Date of Patent: Aug. 25, 2020

(54) METHOD TO ISOLATE REAL-TIME OR SAFETY-CRITICAL SOFTWARE AND OPERATING SYSTEM FROM NON-CRITICAL SOFTWARE AND OPERATING SYSTEM

(71) Applicant: Siemens Aktiengesellschaft, München (DE)

(72) Inventor: Konrad Schwarz, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 120 days.

(21) Appl. No.: 15/549,712

(22) PCT Filed: Feb. 10, 2016

(86) PCT No.: PCT/EP2016/052793
§ 371 (c)(1),
(2) Date: Aug. 9, 2017

(87) PCT Pub. No.: WO2016/128443
PCT Pub. Date: Aug. 18, 2016

(65) Prior Publication Data
US 2018/0068134 A1    Mar. 8, 2018

(30) Foreign Application Priority Data

Feb. 11, 2015 (DE) .................. 10 2015 202 438

(51) Int. Cl.
*G06F 21/74* (2013.01)
*G06F 21/71* (2013.01)
*G06F 21/50* (2013.01)

(52) U.S. Cl.
CPC .............. *G06F 21/74* (2013.01); *G06F 21/50* (2013.01); *G06F 21/71* (2013.01)

(58) Field of Classification Search
CPC ........... G06F 21/74; G06F 21/50; G06F 21/71
See application file for complete search history.

(56) References Cited

U.S. PATENT DOCUMENTS

| | | | |
|---|---|---|---|
| 2004/0153672 A1* | 8/2004 | Watt ...................... | G06F 9/3012 726/22 |
| 2009/0157936 A1* | 6/2009 | Goss ...................... | G06F 1/3203 710/264 |
| 2013/0031374 A1* | 1/2013 | Thom ..................... | G06F 21/57 713/189 |

OTHER PUBLICATIONS

Daniel Sangorrin, Shinya Honda and Hiroaki Takada, "Dual Operating System Architecture for Real-Time Embedded Systems", 6th International Workshop on Operating Systems Platforms for Embedded Real-Time Applications, Jul. 6, 2010, Brussels, Belgium, Workshop Proceedings, pp. 6-15 http://www.researchgate.net/profile/Thomas_Nolte3/publication/254855921_Implementation_of_overrun_and_skipping_in_VxWorks/links/551cf6880cf2909047bcb454.pdf#page=6;.

(Continued)

*Primary Examiner* — Carl G Colin
*Assistant Examiner* — Han Yang
(74) *Attorney, Agent, or Firm* — Schmeiser, Olsen & Watts LLP

(57) ABSTRACT

A method is provided to isolate a secure operation region with a safety-critical software and real-time operating system from a non-secure operation region with non-critical software and general operating system including a non-secure mode, wherein the real-time operating system is inactivated and the general operating system is activated by a secure configuration register and wherein secure interrupts are mapped to fast processor interrupts calling a secure monitor program and non-secure interrupts are mapped to regular processor interrupts by a interface configuration register, and further including a secure mode, wherein the real-time operating system is activated and the general (Continued)

operating system is inactivated by the secure configuration register and wherein secure interrupts are mapped to regular processor interrupts calling the real-time operating system, fast processor interrupts are not used and non-secure interrupts are disabled by the interface configuration register.

5 Claims, 3 Drawing Sheets

(56) References Cited

OTHER PUBLICATIONS

PCT International Search Report and Written Opinion of International Searching Authority dated Apr. 7, 2016 corresponding to PCT International Application No. PCT/EP2016/052793 filed on Feb. 10, 2016.

* cited by examiner

METHOD TO ISOLATE REAL-TIME OR SAFETY-CRITICAL SOFTWARE AND OPERATING SYSTEM FROM NON-CRITICAL SOFTWARE AND OPERATING SYSTEM

CROSS-REFERENCE TO RELATED APPLICATIONS

This application claims priority to PCT Application No. PCT/EP2016/052793, having a filing date of Feb. 10, 2016, based off of German application No. DE 102015202438.5 having a filing date of Feb. 11, 2015, the entire contents of which are hereby incorporated by reference.

FIELD OF TECHNOLOGY

The present disclosure relates to the field of a method to isolate real-time or safety-critical software and operating system from non-critical software and operating system, wherein a switch between the normal and secure worlds is performed in hardware satisfying real time and low power requirements and wherein different interrupts (IRQs and FIQs) are distributed between a Non-Trust state and a Trust state.

A computer system embedded in a larger mechanical or electrical system contains software portions designed to meet stringent real-time or safety-critical requirements (critical software), and software portions with less rigorous requirements (non-critical software). If these portions can interfere with one another, the non-critical software must be developed to the same standards of quality, using the same development processes as the critical software. If these portions can be architecturally isolated from one another, the non-critical software can be developed to less exacting standards without compromising the integrity of the system. For example, it becomes possible to re-use common, off-the-shelf components.

BACKGROUND

Several architectures using a real-time operating system as a hypervisor kernel, or a simple separation hypervisor are known. It is possible for a real-time operating system to provide sufficient functionality allow a para-virtualized general-purpose operating system to execute under the control of the real-time operating system. E.g. the PikeOS operating system from SYSGO implements this model. In a multi-core system that supports hardware virtualization, a simple separation kernel can allocate individual cores to real-time respectively to non-real-time operating systems. Such a hypervisor provides spatial isolation, similar to conventional hypervisors. Temporal isolation is attempted by running the components on individual cores. Although this means that contention for core-local resources, such as the core proper, the inner caches and translation look-aside buffer is eliminated, components still contend for resources shared among the cores, such as outer caches and the memory controller. Thus, it is difficult to obtain reliable worst-case execution times with such a software architecture.

ARM® TrustZone® technology is a system-wide approach to security that can be used to protect services and devices from scalable attacks. Its hardware based security is built-in by chip designers who want to provide secure end points and roots of trust. The family of TrustZone-technologies has been expanded and deepened so that it can be integrated into any ARM-based system.

ARM TrustZone works by partitioning the system wide address space into trusted and non-trusted regions, and by tagging address space (read and write) accesses with their trust status. Untrusted access to a trusted region is prevented by hardware. A TrustZone enabled ARM core is either in Trust state or Non-Trust state and its address space accesses are tagged with the core's present mode. An ARM system also includes an Interrupt Controller, which channels interrupt request signals emanating from system peripherals to the core. The Interrupt Controller can mask a arbitrary subset of the interrupt request lines, and prioritizes the unmasked and active interrupt request signals such that the highest priority interrupt request is presented to the core. A TrustZone system utilizes a TrustZone-aware Interrupt Controller: i.e., core registers are duplicated and the effective target register of an access depends on the trust status of the access.

The publication "Dual Operating System Architecture for Real-Time Embedded Systems", Daniel Sangorrin, Shinya Honda and Hiroaki Takada, 6th International Workshop on Operating Systems Platforms for Embedded Real-Time Applications, Jul. 6, 2010, Brussels, Belgium, Workshop Proceedings, pages 6-15 www.researchgate.net/profile/Thomas_Nolte3/publication/254855921_Implementation_of_overrun_and_skipping_in_VxWorks/links/551cf6880cf2909047bcb454.pdf presents a software architecture to execute concurrently, on a single processor, a real-time operating system (RTOS) and a general-purpose operating system (GPOS). The proposed approach, based on common embedded security hardware (ARM TrustZone®), enables integrated scheduling of both operating systems to enhance the responsiveness of the GPOS soft real-time tasks and interrupts while preserving the determinism of the RTOS and without modifications to the GPOS core. Its low overhead and reliability makes it suitable for embedded applications such as car navigation systems, mobile phones or machine tools.

In the ARM processor, normally there are two interrupt signals: FIQ and IRQ. When a FIQ or IRQ is generated, execution is suspended and the program counter is loaded with the address of the corresponding interrupt vector. In TrustZone, there are independent interrupt vector tables for the Trust and Non-Trust state. If an interrupt occurs while executing in Trust state, the Trust state vector will be executed, and vice versa. An additional state, Secure Monitor Mode, is designed to facilitate transitions between Trust and Non-Trust state. Secure Monitor mode has its own vector table. It is possible to configure whether FIQ respectively IRQ are handled by the Trust/Non-Trust interrupt vector table, or by the Secure Monitor interrupt vector table. In ARM processors, FIQ and IRQ interrupts can be individually disabled (masked). Under TrustZone, the Trust state can prevent the Non-Trust state from disabling the FIQ interrupt, but it is not possible to prevent Non-Trust state from disabling IRQ). For this reason, it is recommended to use IRQs for the Non-Trust state, and FIQs for the Trust state. A TrustZone aware interrupt controller can steer each interrupt request input signal to either the FIQ or the IRQ interrupt request input to the ARM core.

The fast interrupt FIQ was traditionally used for especially low-latency processing. When taking an exception, the ARM processor switches to a mode that depends on the exception. FIQ mode contains a particularly large set of mode-specific registers, minimizing the amount of context switching that needs to be done. However, FIQ does not interact well with other exception modes. In particular, upon taking an exception, IRQ is automatically masked, but FIQ is not. This means it is very difficult to synchronize processing of FIQ exception with other processing. In consequence, FIQ mode tends to be unused by operating systems.

The fast interrupt FIQ was primarily designed within the ARM architecture for memory transfer operations as a substitute for a dedicated Direct Memory Access (DMA) device and has higher priority than all other exceptions of the processor. This fact is fatal for real-time operating systems, because a synchronization respectively mutual exclusion of interrupt services and other services of the operating system is hardly possible but this is, however, fundamental for avoiding race conditions and therefore for the correctness of the RTOS.

Therefore, there is a need for a method to isolate Real-time or Safety-critical Software and Operating System from Non-Critical Software and Operating System, providing a fast switch between the normal and secure worlds satisfying real time requirements and, in an ideal case, without any adjustments of the real-time operating system.

SUMMARY

An aspect relates to a method to isolate a secure operation region with a safety-critical software and real-time operating system from a non-secure operation region with non-critical software and general operating system comprising a non-secure mode, wherein the real-time operating system is inactivated and the general operating system is activated by a secure configuration register and wherein secure interrupts are mapped to fast processor interrupts calling a secure monitor program and non-secure interrupts are mapped to regular processor interrupts by a interface configuration register, and further comprising a secure mode, wherein the real-time operating system is activated and the general operating system is inactivated by the secure configuration register and wherein secure interrupts are mapped to regular processor interrupts calling the real-time operating system, fast processor interrupts are not used and non-secure interrupts are disabled by the interface configuration register. The method works quickly because only two configuration registers have to be written and it minimizes the changes required to the general-purpose operating system and to the real-time operating system. This minimizes the amount of re-certification that needs to be done to the real-time operating system and simplifies the maintenance of the real-time and the general-purpose operating systems.

BRIEF DESCRIPTION

Some of the embodiments will be described in detail, with reference to the following figures, wherein like designations denote like members, wherein:

FIG. 2 shows a schematic diagram illustrating the transitions between Secure and Non-Secure modes, including the system reset and boot phase after power on.

DETAILED DESCRIPTION

Figure 1:
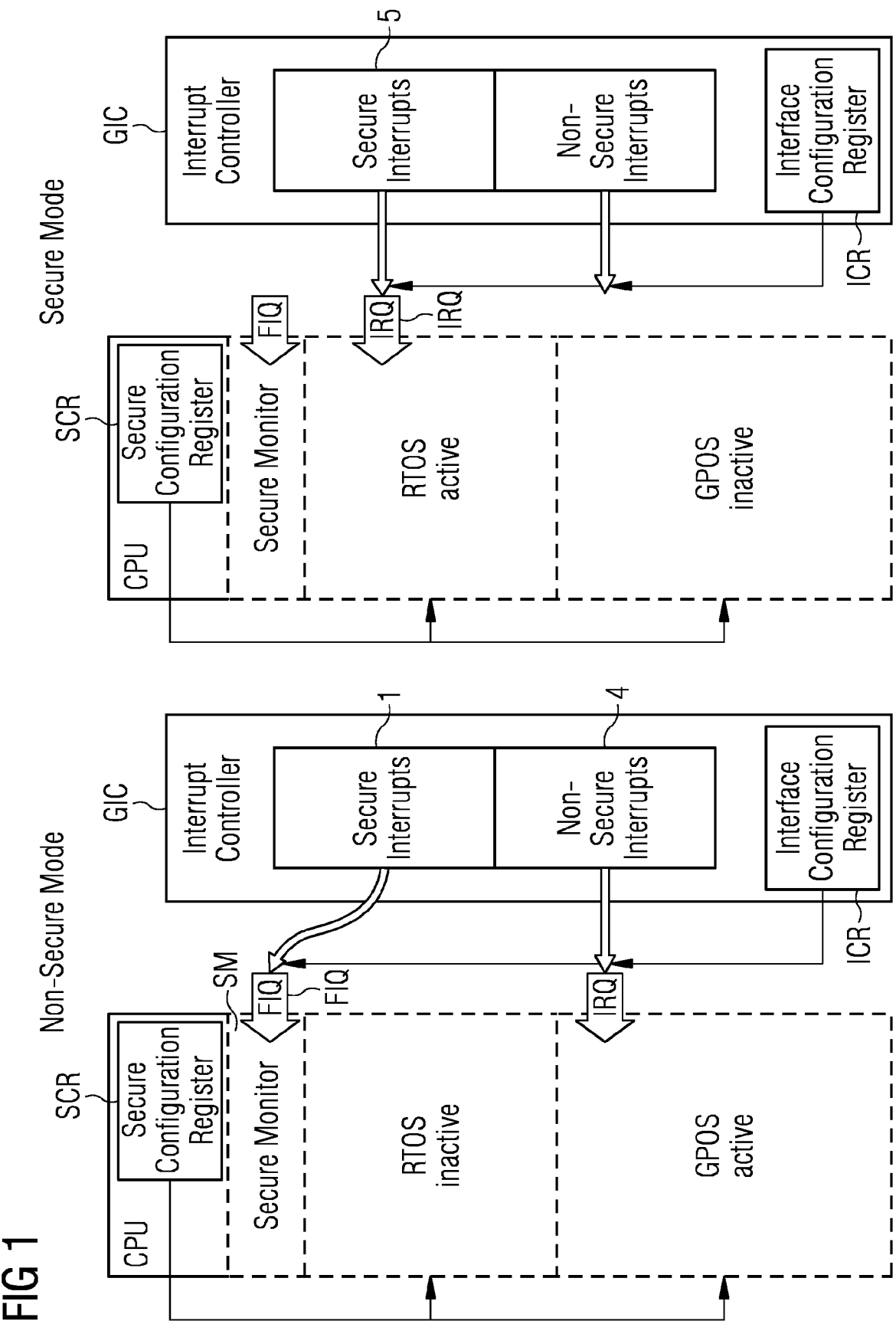
FIG. 1 shows a block diagram illustrating two ARM registers and how secure/non-secure interrupts are mapped to IRQ and FIQ inputs of the CPU in a Non-Secure and a Secure Mode.

FIG. 1 shows a CPU and an interrupt Controller GIC in a non-secure and in a secure mode. The CPU is featuring a secure configuration register SCR, a secure monitor mode SM, a real-time operating system RTOS and a general purpose operating system GPOS. The interrupt controller GIC is featuring an interface configuration register ICR, secure interrupts and non-secure interrupts. The Interface Configuration Register is determining how secure interrupts respectively non-secure interrupts are mapped to the IRQ and FIQ inputs of the CPU.

In the non-secure mode the real-time operating system RTOS is inactivated and the general operating system GPOS is activated by or with the aid of the secure configuration register SCR. In this mode secure interrupts 1 are mapped to fast processor interrupts FIQ calling the secure monitor program SM and non-secure interrupts 4 are mapped to regular processor interrupts IRQ by or with the aid of the interface configuration register ICR.

In the secure mode, however, the real-time operating system RTOS is activated and the general operating system GPOS is inactivated by or with the aid of the secure configuration register SCR. In this mode secure interrupts 5 are mapped to regular processor interrupts IRQ calling the real-time operating system RTOS, fast processor interrupts FIQ are not used and non-secure interrupts are disabled by or with the aid of the interface configuration register ICR.

Figure 2:
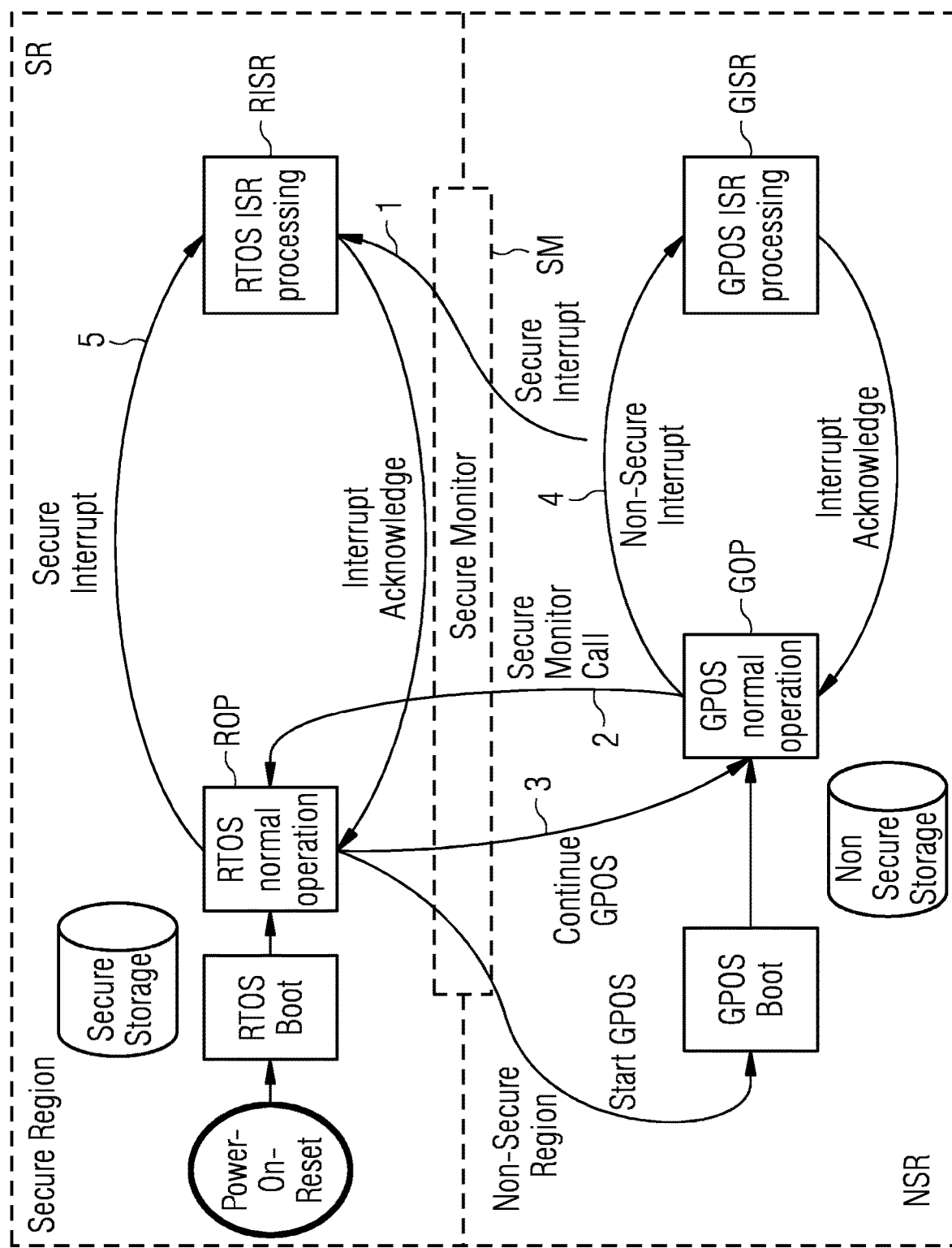

FIG. 2 shows a schematic diagram with a secure region SR with a secure storage and a non-secure region NSR with a non-secure storage and transitions, wherein all the transitions between both regions make use of the secure monitor program SM and all other transitions do not.

After "power on" or "system reset" a TrustZone-processor boots in secure mode respectively in the shown secure region SR. After booting the real-time operating system RTOS the system is proceeding to normal RTOS operation ROP. This normal operation shows one transition invoking a secure interrupt 5 and a corresponding RTOS interrupt sequence processing RISR sending back a interrupt acknowledge to the operation ROP and a further transition starting the booting of the general purpose operating system GPOS in the non-secure region NSR via the secure monitor program SM.

After booting the general purpose operating system GPOS the system is proceeding to normal GPOS operation GOP. This normal operation shows one transition invoking a non-secure interrupt 4 and a corresponding GPOS interrupt sequence processing GISR sending back an interrupt acknowledge to the operation GOP.

During system initialization, the security status of memory regions, peripheral controllers, and interrupts need to be configured. Secure interrupts that need to preempt the general-purpose operating system must be given a priority in the upper half of the priority range.

A low-priority thread is created in the real-time operating system RTOS. The general-purpose operating system GPOS will run in the context of this thread, the secure monitor thread, which must have supervisor privileges. From the viewpoint of the real-time operating system RTOS, execution of the general-purpose operating system is no different from an ordinary thread. This aspect of the method minimizes the changes required of the real-time operating system.

Execution is switched to the context of the general-purpose operating system and, initially, its entry address or the entry address of its boot loader.

Further, transitions for a secure interrupt 1, a secure monitor call 2 and a continuation return 3 for the general operating system GPOS using the secure monitor SM are shown.

The secure interrupt 1 while the system is operating in the non-secure region NSR requires initiating the interrupt service routine processing RISR in the real-time operating system RTOS via the secure monitor, the secure monitor call 2 is starting from the normal operation GOP by initiating a service call to normal operation ROP of the real-time operating system RTOS and finally the continuation return 3 for the general operating system GPOS comes from a normal operation ROP of the real-time operating system RTOS and is returning control to normal operation GOP of the general operating system GPOS after completing either RISR or ROP processing.

There are two ways execution can be switched back to the real-time operating system: via a secure monitor call 2 by the general-purpose operating system or because a secure interrupt 5 becomes pending. If a secure interrupt 5 becomes pending, because its priority is higher than the priority in the priority mask register of the interrupt controller, the interrupt controller will cause a secure interrupt, the secure monitor will then transform this into ordinary RISR processing.

Figure 3:
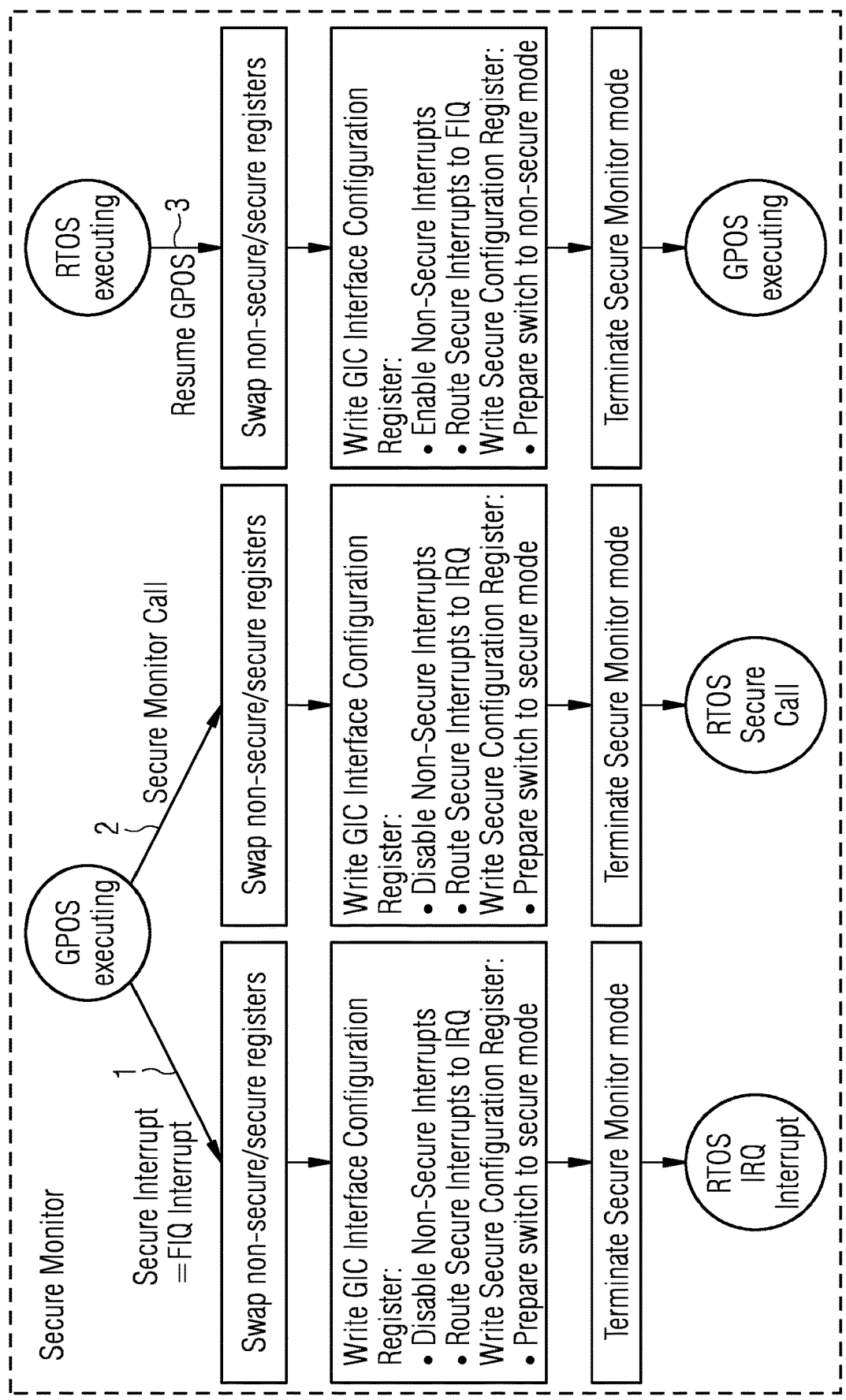
FIG. 3 shows a second schematic diagram illustrating the steps a Secure Monitor must take to effect the transitions between Secure and Non-Secure modes.

FIG. 3 shows a second schematic diagram illustrating the steps a secure monitor SM must take to effect the transitions for the secure interrupt 1, the secure monitor call 2 and the continuation return 3.

First of all, the non-secure and the secure general-purpose and floating-point register contents have to be swapped, then the interface configuration register ICR and the secure configuration register SCR must be written and finally the secure monitor mode must be terminated.

Secure interrupts 1 are enabled and configured to be signaled via FIQ. In the case of a secure interrupt 1 and an executing general purpose operating system GPOS, by writing the interface configuration register ICR, the non-secure interrupts are disabled and secure interrupts are routed to regular processor interrupts IRQ and, by writing the secure configuration register SCR, a switch to the secure mode is prepared. The secure FIQ exception handler context switches to secure mode via the secure configuration register SCR, disables non-secure interrupts and configures secure interrupts as IRQ interrupts via the Interface Configuration Register ICR, then enables interrupts and switches to system mode (the normal privileged mode of ARM). As the interrupt is still pending, but now as an ordinary IRQ, the IRQ exception handler of the real-time operating system is invoked. As secure interrupts are not masked, the real-time behavior of the real-time operating system is unchanged. (Interrupt latency increases slightly because of the processing needed to switch from Non Trust to Trust mode.)

If the executing general-purpose operating system GPOS has invoked a secure monitor call 2, by writing the interface configuration register ICR, the non-secure interrupts are also disabled and secure interrupts are also routed to regular processor interrupts IRQ and, by writing the secure configuration register SCR, a switch to the secure mode is also prepared.

In the case of the continuation call 3 for resuming the general purpose operating system GPOS and an executing real-time operating system RTOS, by writing the interface configuration register ICR, the non-secure interrupts are enabled and secure interrupts are routed to fast processor interrupts FIQ and, by writing the secure configuration register SCR, a switch to the non-secure mode is prepared. The secure FIQ exception handler disables interrupts and switches to non-secure mode via the secure configuration register SCR, configures secure interrupts as FIQ and enables non-secure interrupts via the interface configuration register ICR, and context switches back to non-secure mode.

This ends with an exception return, which restores the interrupt masking state of non-secure interrupts automatically. The general-purpose operating GPOS system resumes where it left off.

Generalization to a multi-core processor is straightforward: It is now necessary to have a secure monitor thread for each core which is bound to that core. The variables required for context switching etc. become per-core variables.

Embodiments of the invention also provide a computer program or a computer program product (non-transitory computer readable storage medium having instructions, which when executed by a processor, perform actions) for carrying out any of the methods described herein. A computer program embodying the invention may be stored on a computer-readable medium, or it could, for example, be in the form of a signal such as a downloadable data signal provided from an Internet website, or it could be in any other form.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method to isolate a secure operation region with a safety-critical software and a real-time operating system from a non-secure operation region with a non-critical software and a general operating system, and synchronize interrupt services between the real-time operating system and the general operating system, comprising:
   providing a non-secure mode:
   wherein the real-time operating system is inactivated and the general operating system is activated by a secure configuration register, and
   wherein secure interrupts are mapped to fast processor interrupts calling a secure monitor program and non-secure interrupts are mapped to regular processor interrupts by an interface configuration register; and
   providing a secure mode:
   wherein the real-time operating system is activated and the general operating system is inactivated by the secure configuration register, and
   wherein secure interrupts are mapped to regular processor interrupts calling the real-time operating system, fast processor interrupts are not used and non-secure interrupts are disabled by the interface configuration register for the duration of operation in the secure mode.

2. The method according to claim 1, further comprising:
   providing a secure interrupt from a normal operation of the general operating system by initiating an interrupt service routine processing of the real-time operating system via a secure monitor program;
   providing a secure monitor call from a normal operation of the general operating system by initiating a normal operation f the real-time operating system via the secure monitor program; and
   providing a continuation call for the general operating system from a normal operation of the real-time operating system by initiating a normal operation of the general operating system via the secure monitor program.

3. The method according to claim 2, wherein the secure monitor program is:

swapping non-secure/secure registers;
disabling non-secure interrupts and routing secure interrupts to regular processor interrupts by writing an interface configuration register if the general operating system is active;
enabling non-secure interrupts and routing secure interrupts to fast processor interrupts by writing the interface configuration register if the real-time operating system is active;
activating the real-time operating system by writing a secure configuration register if the general operating system is active;
activating the general operating system by writing a secure configuration register if the real-time operating system is active; and
terminating the secure monitor program.

4. A computer program product, comprising a computer readable hardware storage device having computer readable program code stored therein, said program code executable by a processor of a computer system to implement a method for isolating a secure operation region with a safety-critical software and a real-time operating system from a non-secure operation region with a non-critical software and a general operating system, and synchronizing interrupt services, comprising:
providing a non-secure mode:
wherein the real-time operating system is inactivated and the general operating system is activated by a secure configuration register, and
wherein secure interrupts are mapped to fast processor interrupts calling a secure monitor program and non-secure interrupts are mapped to regular processor interrupts by an interface configuration register; and
providing a secure mode:
wherein the real-time operating system is activated and the general operating system is inactivated by the secure configuration register, and
wherein secure interrupts are mapped to regular processor interrupts calling the real-time operating system, fast processor interrupts are not used and non-secure interrupts are disabled by the interface configuration register and cannot be enabled until the non-secure mode is used.

5. A computing system, comprising:
a processor;
a memory coupled to the processor;
a secure operation region with a safety-critical software and a real-time operating system; and
a non-secure operation region with a non-critical software and a general operating system;
wherein the real-time operating system and the general operating system are executed on the processor,
wherein the computing system is configured to isolate the secure operation region from the non-secure operation region, and synchronize interrupt services between the secure operation region and the non-secure operation region, by:
providing a non-secure mode wherein the real-time operating system is inactivated and the general operating system is activated by a secure configuration register and wherein secure interrupts are mapped to fast processor interrupts calling a secure monitor program and non-secure interrupts are mapped to regular processor interrupts by an interface configuration register; and
providing a secure mode wherein the real-time operating system is activated and the general operating system is inactivated by the secure configuration register and wherein secure interrupts are mapped to regular processor interrupts calling the real-time operating system, fast processor interrupts are not used and non-secure interrupts are disabled by the interface configuration register such that non-secure interrupts are only enabled in the non-secure mode.

* * * * *